Dec. 28, 1943. C. G. PULLIN 2,337,570
STABILIZATION AND CONTROL OF ROTATING WING AIRCRAFT
Filed April 24, 1940 15 Sheets-Sheet 1
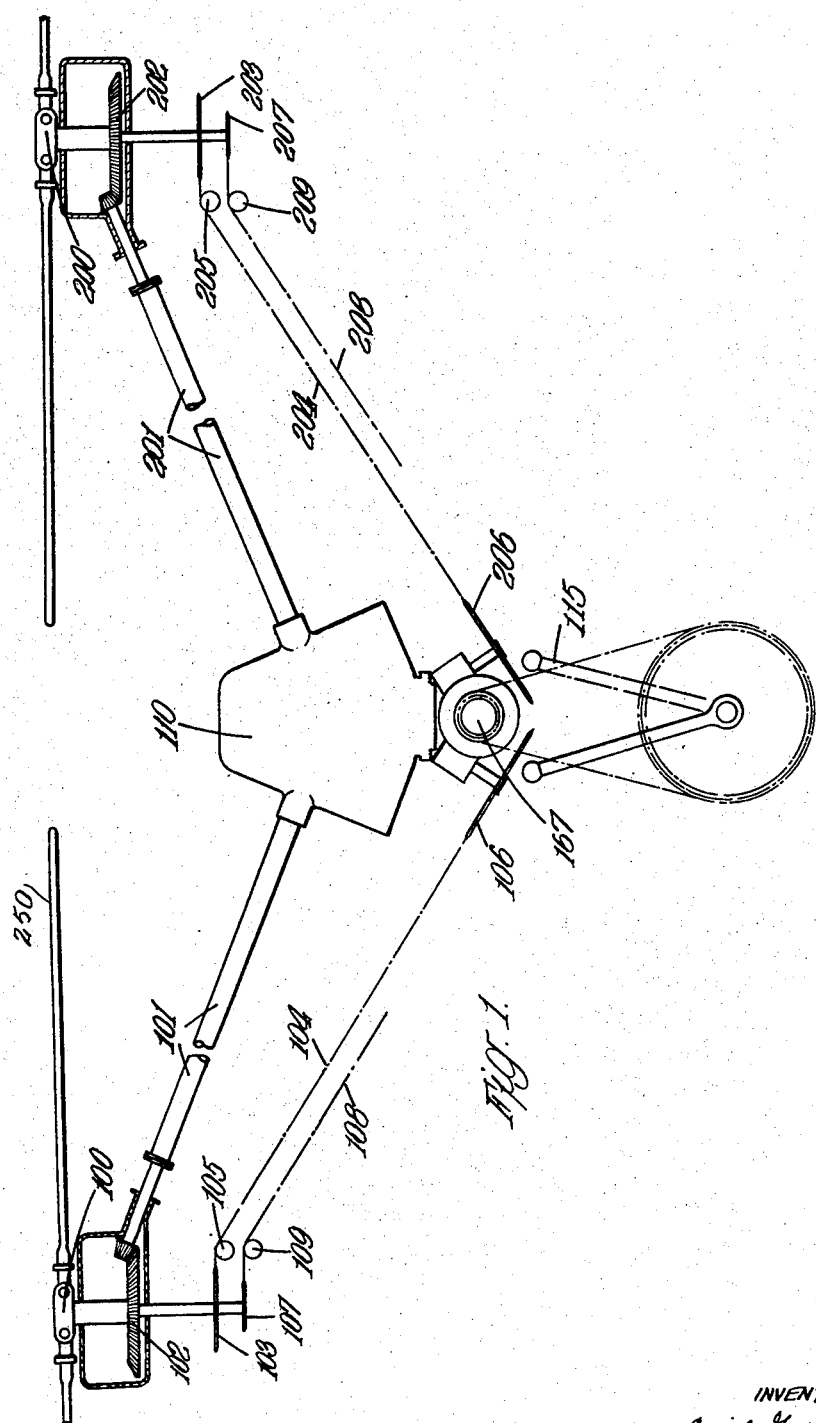
INVENTOR
Cyril George Pullin
ATTORNEYS

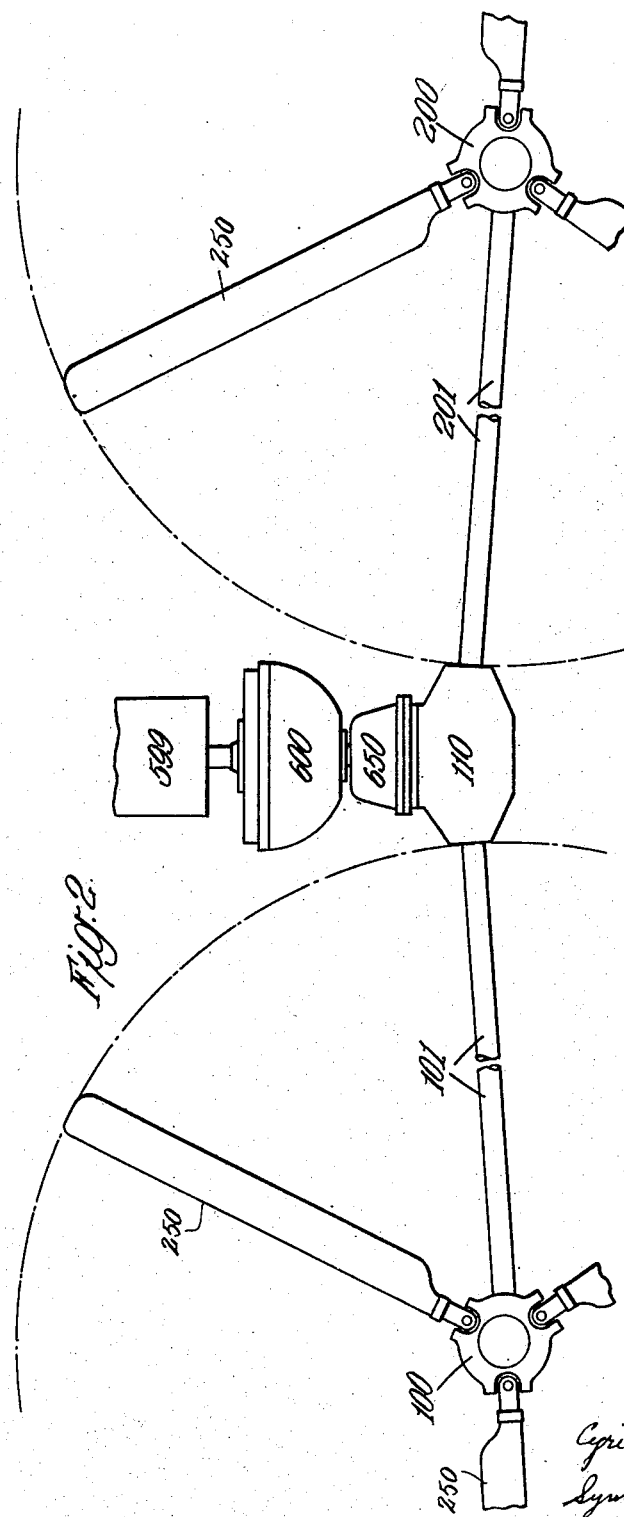

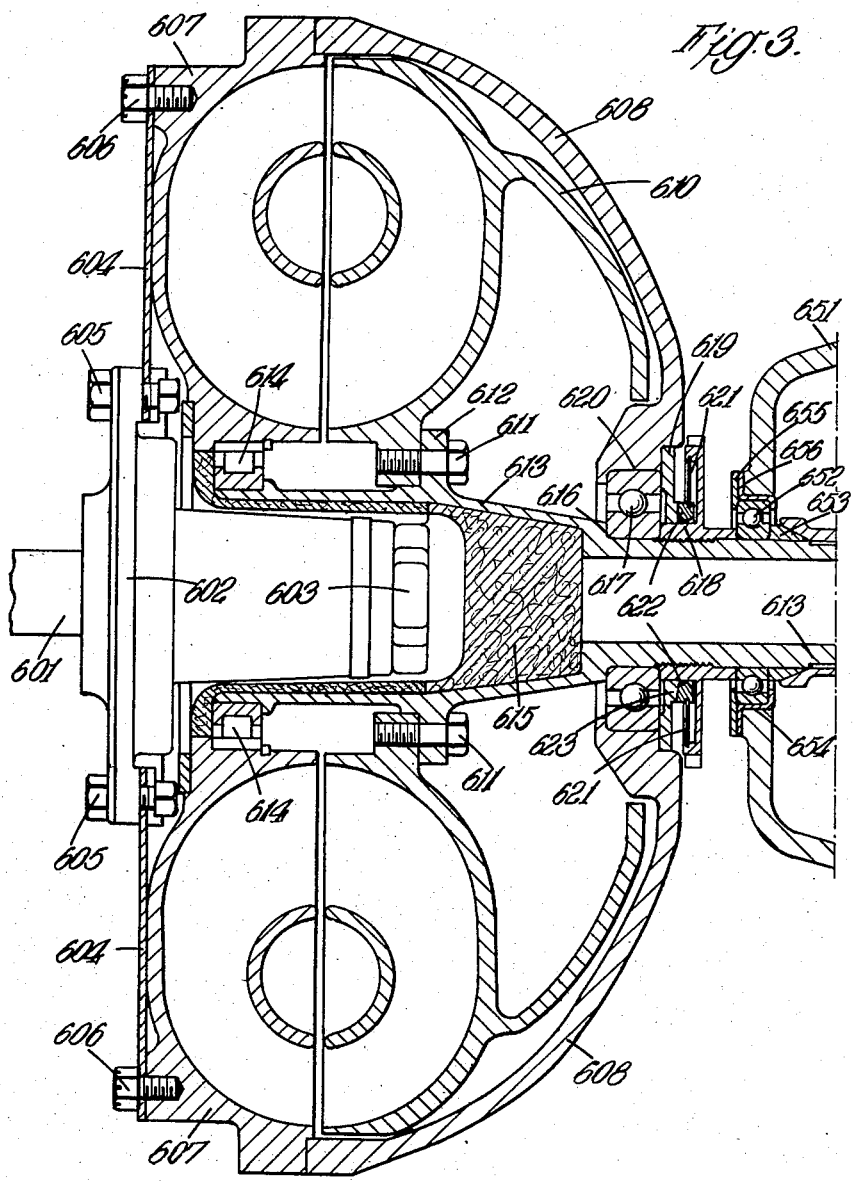

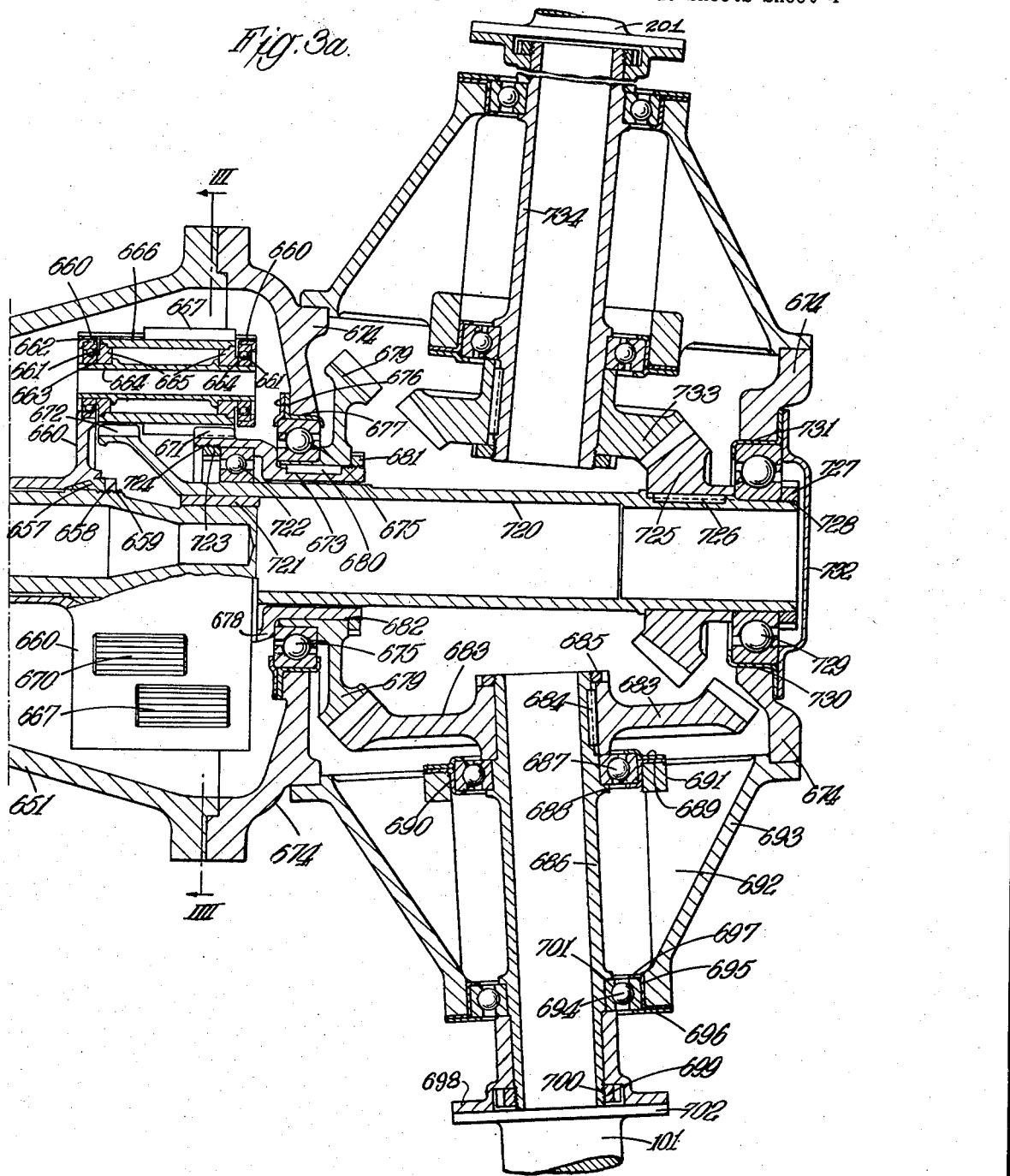

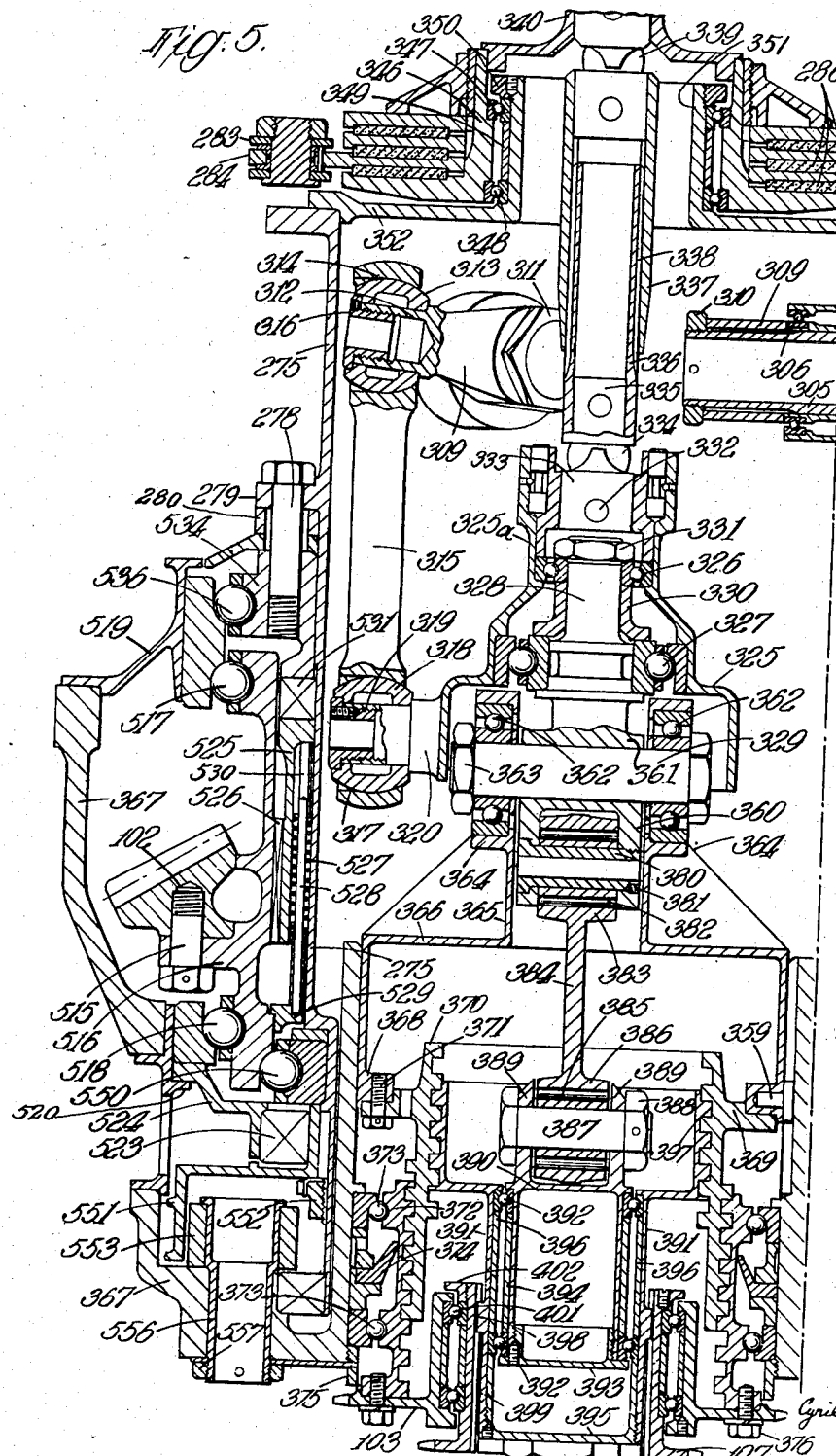

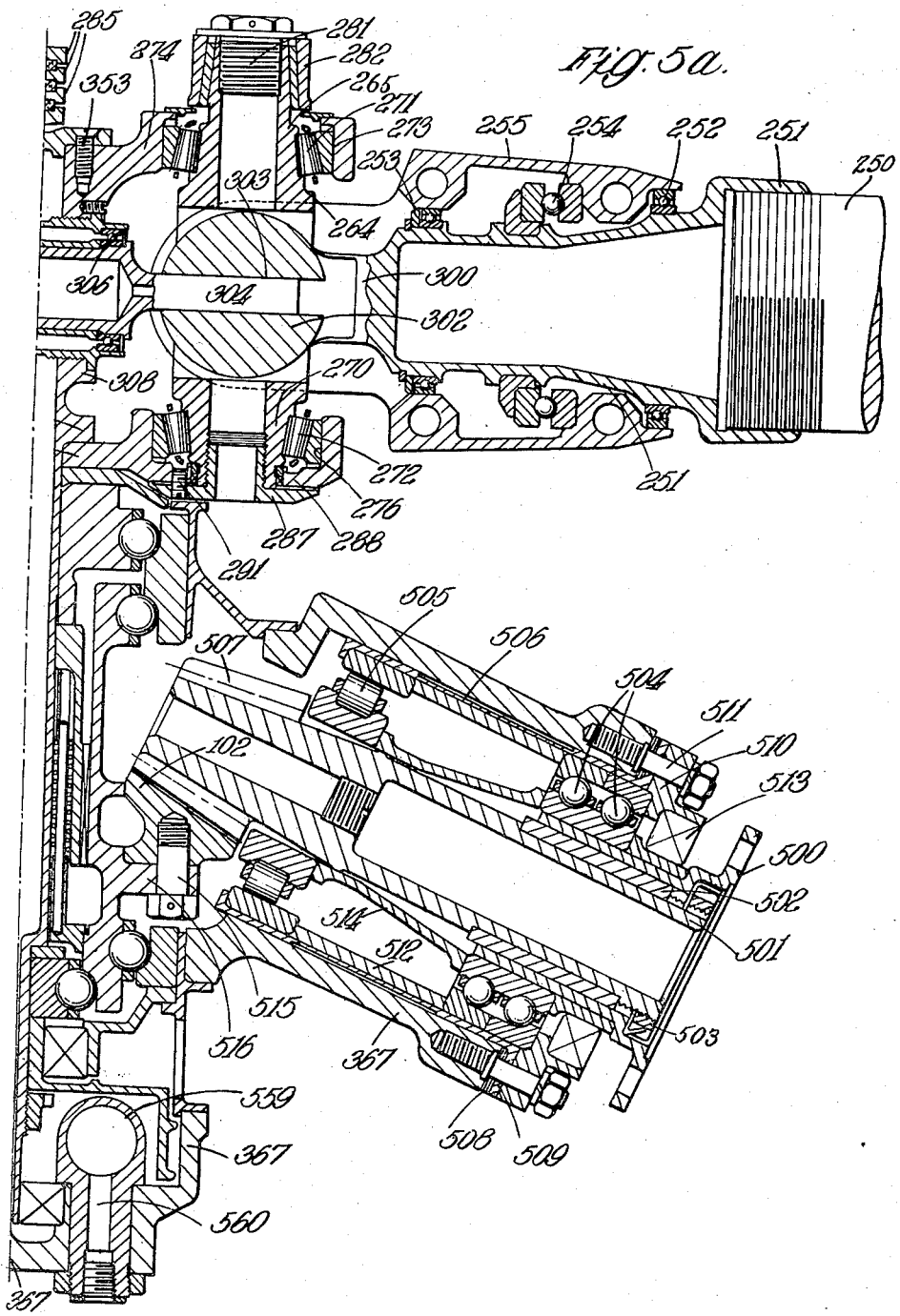

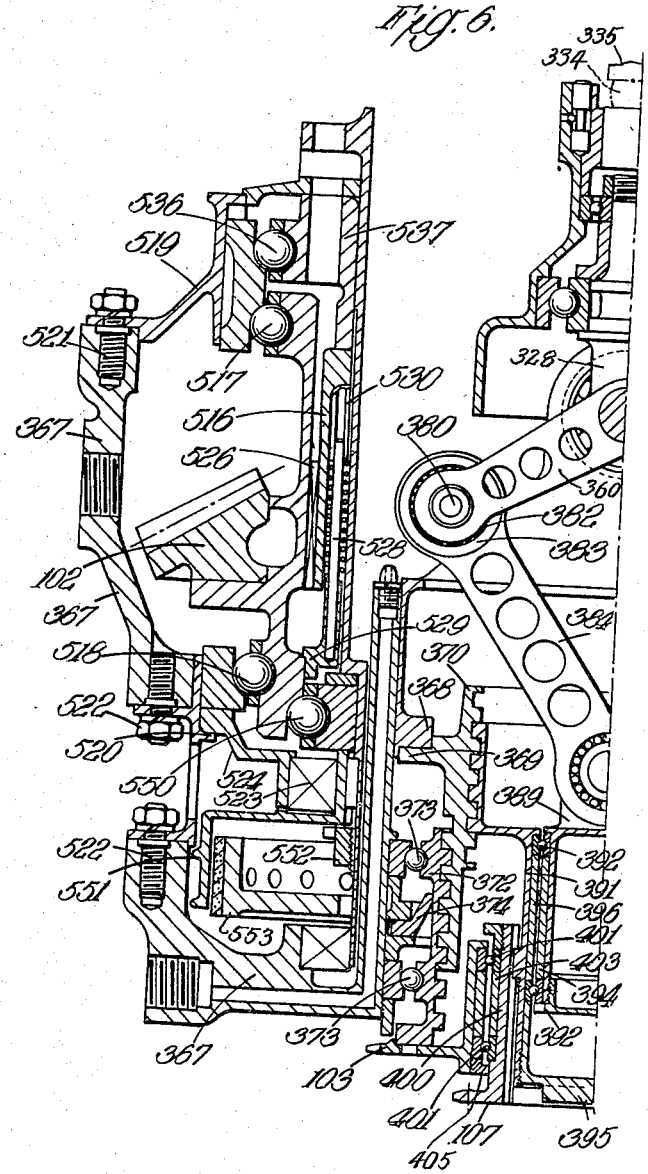

Dec. 28, 1943.   C. G. PULLIN   2,337,570
STABILIZATION AND CONTROL OF ROTATING WING AIRCRAFT
Filed April 24, 1940   15 Sheets-Sheet 9
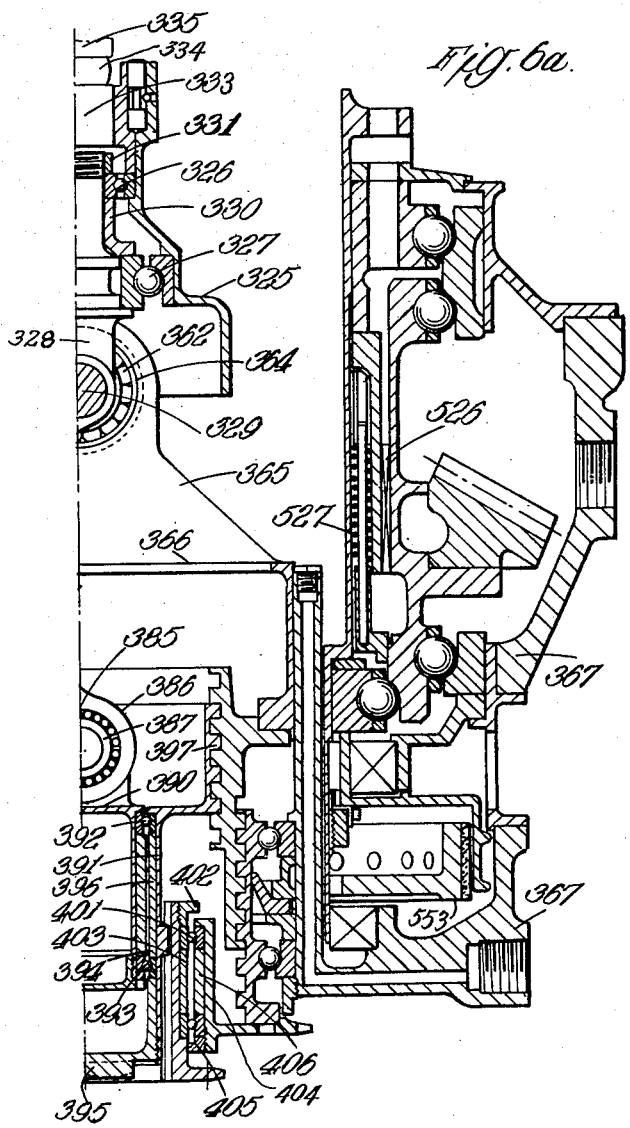
INVENTOR
Cyril George Pullin
ATTORNEYS
Lynnestvedt + Lechner

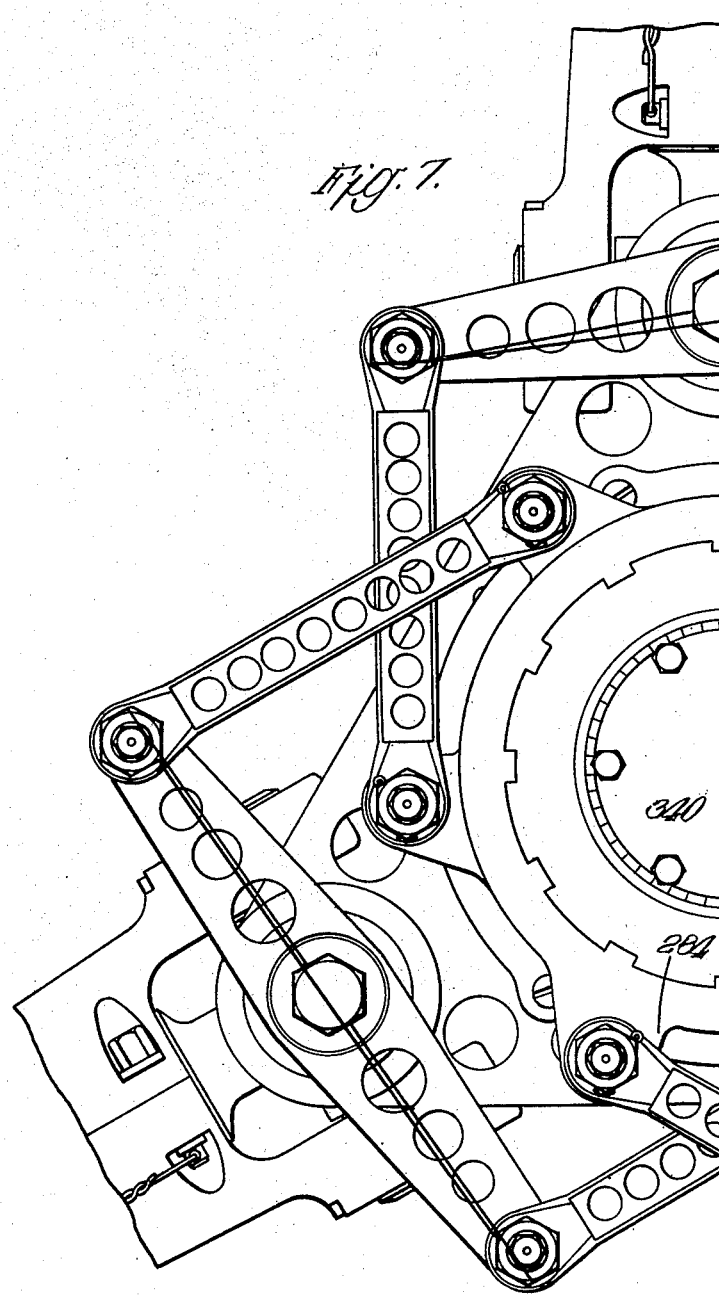

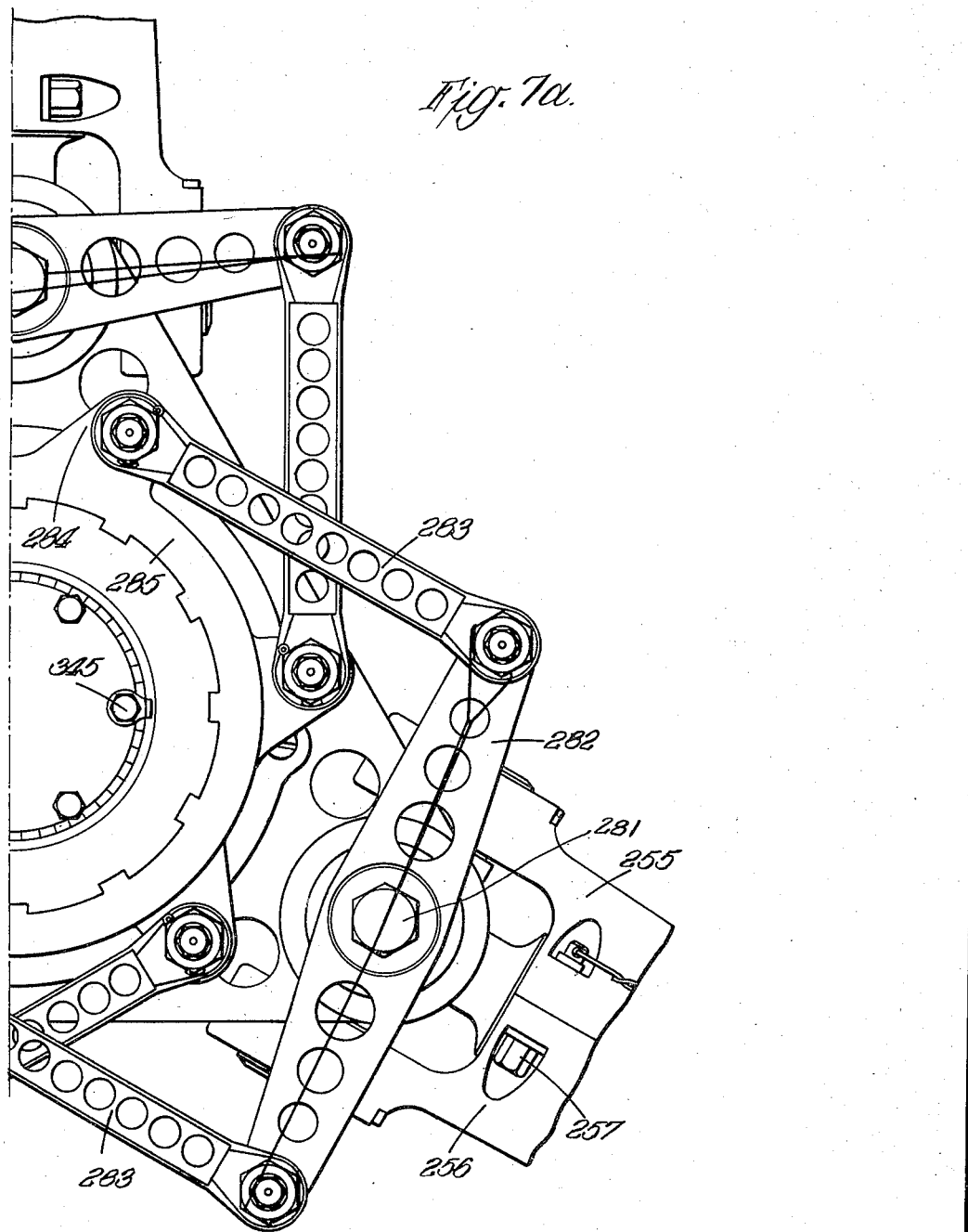

Dec. 28, 1943.  C. G. PULLIN  2,337,570
STABILIZATION AND CONTROL OF ROTATING WING AIRCRAFT
Filed April 24, 1940    15 Sheets-Sheet 12
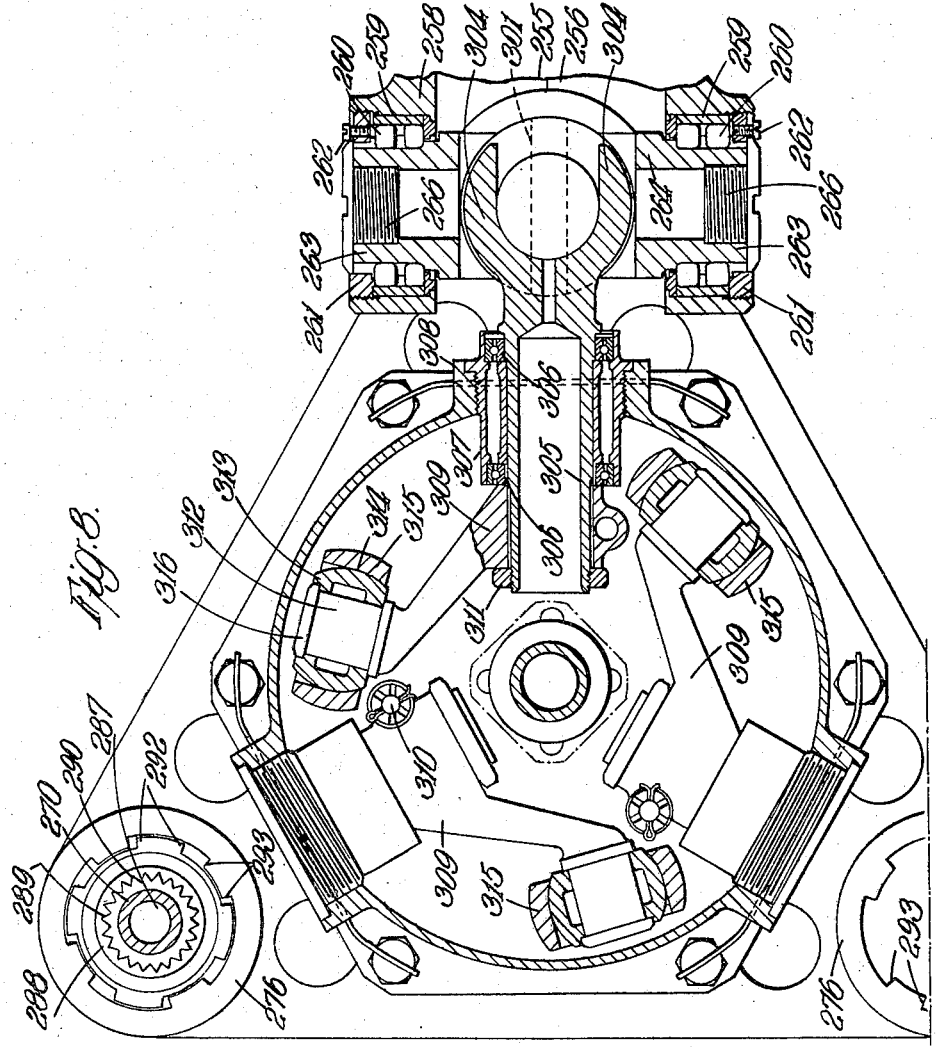
INVENTOR
Cyril George Pullin
ATTORNEYS

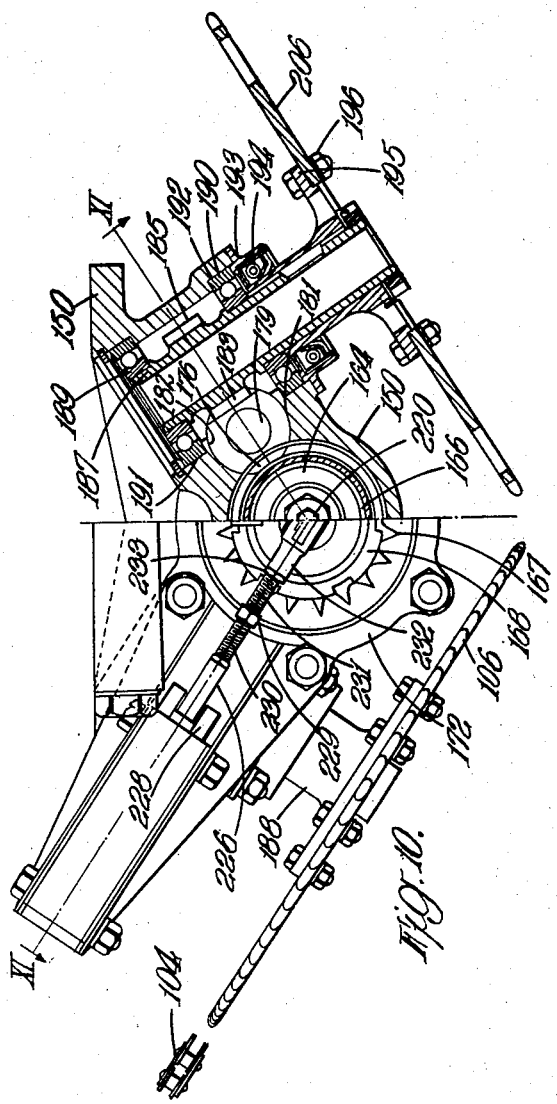

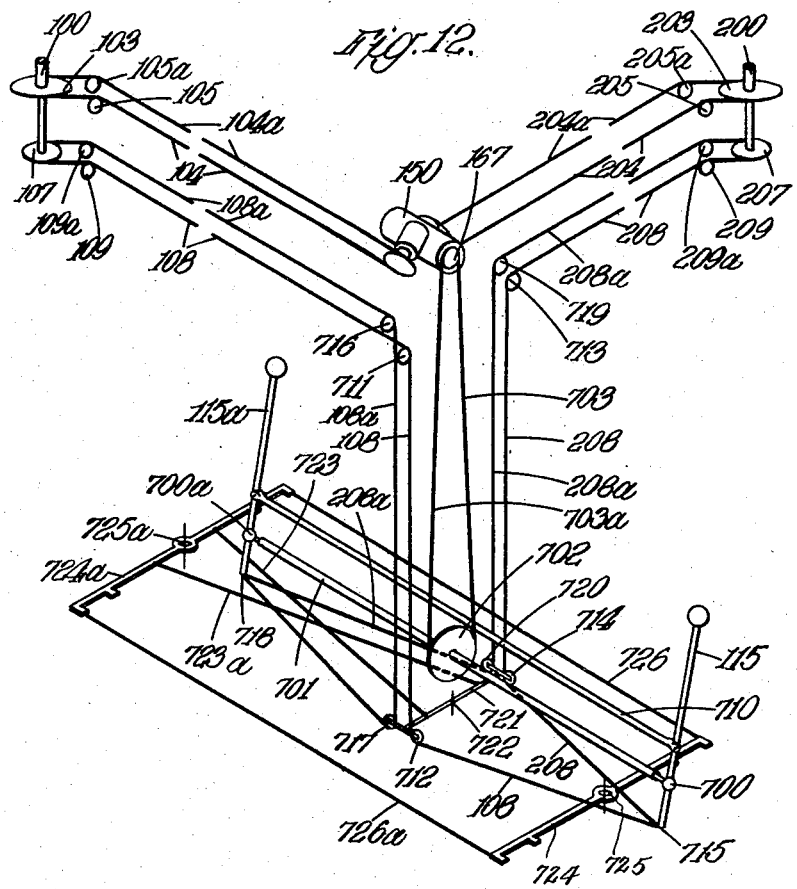
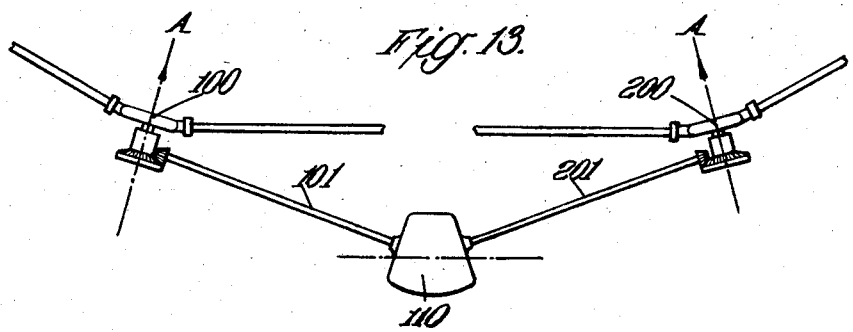

Patented Dec. 28, 1943

2,337,570

UNITED STATES PATENT OFFICE 2,337,570

STABILIZATION AND CONTROL OF ROTATING WING AIRCRAFT

Cyril George Pullin, Genista, Newton Mearns, Scotland, assignor to Autogiro Company of America, Willow Grove, Pa., a corporation of Delaware Application April 24, 1940, Serial No. 331,318
In Great Britain March 2, 1939

25 Claims. (Cl. 244—17)

The present invention relates to stabilization and control of rotating wing aircraft, and particularly to means for effecting the stability and control of rotating wing aircraft of the type having one or more pairs of normally power driven sustaining rotors disposed on opposite sides of the fuselage or body of the aircraft.

In aircraft having a pair of sustaining rotors driven at equal speeds from a common shaft through a gearbox and disposed on opposite sides of the fuselage it is possible under certain conditions for the lift of one of the rotors to exceed the lift of the other by an amount giving rise to dangerous overturning moments of the aircraft. These overturning moments may cause the aircraft to bank excessively to a position in which lateral control can no longer be maintained. An object of this invention is to provide means for preventing the setting up of such dangerous conditions so that control of the aircraft may be maintained.

According to the present invention substantial equality of the torque applied to each of a pair of rotors is maintained, at least under normal flight conditions while the rotors are being driven, by a balance gear, for instance of the differential type. This balance gear will be effective to maintain equality of torque in the pair of rotors except insofar as this balance of torque is affected by the mechanical imperfection of the balance gear and by the inertia of the rotors and transmission system. Moreover in the event of a failure of the transmission to one of the rotors the balance gear will relieve the other rotor of the drive and will spin idly.

It is most desirable that means should be provided permitting the rotors to continue revolving in the event of an engine or transmission failure so that sufficient lift is maintained to allow the aircraft to be landed safely. This may be accomplished by providing means for disconnecting the engine from both the rotor transmissions, for instance by manually or automatically disconnecting a clutch on the engine shaft or by including in this shaft a freewheel clutch. Alternatively each rotor hub or transmission may include a freewheel clutch, it being known practice in this art to incorporate such clutch in the individual hub or transmission; but in the present case I employ the freewheel clutches in a novel relationship to a differential drive or balance gear.

Advantageously the balance gear of the present invention is used in conjunction with means for controlling the pitch of the rotors, said means being either under the control of the pilot or automatic, so that in the event of a cessation of the drive the rotor pitches can be or are adjusted to a value within the autorotational range. Automatic means for performing this operation are disclosed in my copending application dated January 30, 1940, Serial Number 316,330 (Patent 2,325,632) which describes and claims the use of means responsive to the rotational speed of the rotors controlling, through an hydraulic relay mechanism, rotor pitch changing means.

Lateral control of the aircraft may be obtained by providing means for differential alteration of the pitch of each of the pair of rotors so that the lift of one rotor is increased while that of the other is decreased, these means being coupled to a pilot's control column or analogous control so that sideways movement of the control column causes such differential pitch change.

Angular tilting of the lift lines of the two rotors may be used to give control of the aircraft in pitch and also in yaw, the former being obtained by simultaneous equal shifting of the lift lines of the rotors in a generally fore and aft direction by moving the pilot's control column or analogous control in a backwards and forwards direction. The control of the aircraft in yaw normally obtained by a rudder bar or equivalent control, is provided by differential tilting of the lift lines of the two rotors so that while the lift line of one rotor is tilted forwardly the lift line of the other rotor is tilted backwardly.

The accompanying drawings illustrate by way of example a rotor transmission system, a rotor hub and control means for use therewith, all constructed in accordance with this invention.

In the drawings:

Fig. 1 is a diagrammatic rear elevation of the rotor transmission and control system;

Fig. 2 is a plan view corresponding to Fig. 1;

Fig. 3 is a sectional plan through a part of the rotor transmission system and the balance gear;

Fig. 3A is a continuation of Fig. 3 on the right hand side;

Fig. 5 is a sectional elevation of a rotor hub;

Fig. 5A is a continuation of Fig. 5 on the right hand side;

Fig. 6 is a fragmentary elevation through the hub at right angles to Fig. 5;

Fig. 6A is a continuation of Fig. 6 on the right hand side;

Fig. 7 is a plan view of the rotor hub;

Fig. 7A is a continuation of Fig. 7 on the right hand side;

Fig. 8 is a fragmentary sectional plan view through the rotor hub at the general plane of attachment of the rotor blades;

Fig. 10 is a rear elevational view, partly in section, showing the pitch control mechanism;

Fig. 12 shows diagrammatically the control system;

Fig. 13 is an elevational view showing diagrammatically a modified arrangement in which the rotor hub axes are inclined upwardly towards each other to provide a dihedral action.

Figure 4:
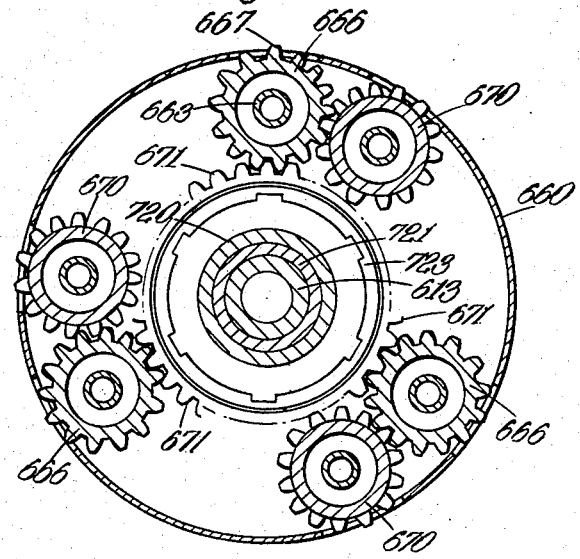
Fig. 4 is a section on the line IV—IV of Fig. 3.

Referring to the drawings, Figs. 1 and 2. A helicopter has a pair of side-by-side rotors 100, 200 of similar construction which rotate in opposite directions. These are shown diagrammatically in Fig. 1 which shows them driven through shafts 101, 201 and bevel drives 102, 202 respectively. Below the rotor 100, as seen in Figures 1 and 12, is mounted a chain wheel 103 which is driven by a short length of chain coupled to control wires 104, 104a passing over pulleys 105, 105a from a sprocket 106 of the pitch change control hereinafter described. Below the chain wheel 103 is mounted a smaller chain wheel 107 which is coupled by control wires 108, 108a passing over pulleys 109, 109a to a pilot's control for effecting cyclic pitch change of the rotor, hereinafter described in detail with reference to Fig. 12. Similar arrangements are provided for the rotor 200, the parts corresponding to the parts 103 to 109a having reference numbers 203 to 209a.

The rotor drive shafts 101, 201 are driven from a gearbox 110 on the centre line of the aircraft. An engine 599 drives the gearbox 110 through a fluid coupling 600 and a spur type differential gear 650. These are illustrated diagrammatically in Fig. 2 and in detail in Figs. 3, 3A, and 4.

Referring to the latter figures: A bush 602 is secured on the engine shaft 601 by a screw nut 603 and splines (not shown) and to the inner edge of an annular flexible diaphragm 604 by bolts 605. The outer edge of the diaphragm 604 is bolted at 606 to the driving rotor member 607 of the fluid coupling to which is secured a casing part 608 enclosing the other parts of the fluid coupling 600. The driven rotor member 610 is bolted at 611 to a flange 612 of the driven shaft 613 which extends from the fluid coupling 600 to the differential gear 650. An extension of the shaft 613 (towards the engine) carries a journal roller bearing 614 which acts as a centering bearing between the driving and driven rotor members 607 and 610 respectively and also an oil seal 615. A shoulder 616 on the driven shaft 613 locates a journal ball-bearing 617 interposed between the shaft 613 and the casing part 608, the inner element of the bearing 617 being secured to the shaft 613 by a flanged ring 618 screwed onto said shaft while the outer element of the bearing is secured by a ring 619 in a recess 620 in the casing part 608. The flanged ring 618 carries a spring diaphragm 621 which presses a packing ring 622 into contact with a face 623 on the ring 619 thereby forming an oil seal.

If it is desired to disconnect the drive from the engine to the rotors this can be accomplished by means not shown which allow fluid to be taken out of the fluid coupling 600. Such disconnection of hydraulic couplings of this type is well known in the coupling art.

It is thought unnecessary to describe in detail the construction of the rotor members 607 and 610 or the method of operation of the coupling since the provision of a suitable fluid coupling for transmitting the necessary power is within the competence of those skilled in the industry.

The driven shaft 613 of the fluid coupling 600 as above mentioned extends into the differential gear 650 and is journalled in the casing 651 by a bearing 652, the inner element of which is clamped on said shaft 613 between the flanged ring 618 and a centering wedge ring 653. The outer element of the bearing 652 is held in a recess 654 in the casing 651 by a locating plate 655 and annulus 656. The centering wedge ring 653 cooperates with a similar wedge ring 657 and a ring 658 mounted on a screw thread 659 on the end of the shaft 613 to secure to said shaft the carrier 660 of the differential gear.

The carrier 660 supports by means of roller journal bearings such as 661 held in recesses 662, hollow shafts 663 having shoulders 664 locating bushes 665 on which are carried hollow pinions 666. The teeth 667 formed on the exterior of the hollow pinions 666 only extend over about two thirds of the length of the pinions from one end as shown in Fig. 3. The carrier 660 carries two sets of such pinions, each set as illustrated consisting of three pinions disposed at 120° about the axis of the shaft 613 (see Fig. 4). The pinion 666 which is illustrated in section in Fig. 3A is one of the set marked 666 in Fig. 4 while those of the other set are marked 670 and are similarly mounted on the carrier 660.

It will be understood that the teeth 667 of the pinions 666 extend from the right hand end (as shown in Fig. 3A) to a point about two thirds of the way along the pinion, the left hand end of which carries no teeth. The teeth of the pinions 670 extend a similar distance from the left hand end, while the right hand end is smooth. As shown in Fig. 4 the pairs of pinions 666 and 670 mesh together over their middle parts, while their toothed ends mesh with toothed wheels 671 and 672 respectively.

The wheel 671 (Fig. 3A) is formed on a stub shaft 673 journalled in the casing 674 by a ball bearing 675 the outer element of which is secured to the casing by a locating plate 676 and annulus 677. The inner element of the bearing 675 is clamped between a shoulder 678 on the stub shaft 673 and a bevel wheel 679 having an extended bush keyed at 680 to the stub shaft 673 and secured thereto by a screw threaded ring 681 engaged on a screw thread 682 at the end of the stub shaft.

The bevel wheel 679 meshes with a bevel wheel 683 keyed at 684 and secured by a threaded ring 685 to the inner end of a shaft 686 through which the drive is transmitted to the port rotor. The shaft 686 is journalled at its inner end by a journal and thrust bearing 687, the inner element of which is clamped between a shoulder 688 on the shaft and the bevel wheel 683. The outer element of the bearing 687 is secured by a locating plate 689 and annulus 690 to a ring 691 carried by webs 692 within the casing 693 of the gearbox 110. Near its outer end the shaft 686 is supported by a journal bearing 694 supported in an aperture 695 in the casing 693 and held in position by a clamping plate 696 and annulus 697. A flange 698 is secured to the end of the shaft 686 by a ring 699 which engages a screw thread 700 on the end of the shaft. An extension of the flange serves to press the inner element of the bearing 694 against a shoulder 701 on the shaft 686. A flange 702 at the inner end of the rotor drive shaft 101 is bolted to the flange 698.

The drive to the starboard rotor passes from the pinions 670 to the wheel 672 which is formed integrally with a hollow shaft 720 which has a spigot bearing 721 interposed between it and the driven shaft 613 of the fluid coupling. A ball bearing 722 surrounds the shaft 720 and maintains it concentric with the stub shaft 673, the outer element of the bearing being held in position by a ring 723 engaging a screw thread 724 within the end of the stub shaft.

As seen in Figure 3A, the right hand end of the shaft 720 has a bevel wheel 725 keyed at 726 to it and secured in position by a ring 727 engaging a screw thread 728 on the end of the shaft 720. A journal and thrust bearing 729 supports this end of the shaft, being clamped between the bevel wheel 725 and the ring 727 while the outer element is held in position in an aperture 730 in the casing 674 by an annulus 731 and cover plate 732. The bevel wheel 725 meshes with a bevel wheel 733 carried on a shaft 734 mounted in the same way as the shaft 686 and transmitting the drive to the port rotor drive shaft 201. The gear ratio of the wheels 679 and 683 must of course be equal to the ratio of the wheels 725 and 733.

The differential gear 650 ensures that the torques of the two rotors shall be maintained substantially equal. The provision of free wheels in the drives to each of the rotors will however allow the torques absorbed by the rotors momentarily to be unequal when one or both of the rotors is overrunning the drive.

While no mention of an airscrew drive has been made in the foregoing description it is to be understood that one or more airscrews for forward propulsion may be provided and be driven in a suitable manner from the engine 599 or from one or more other engines mounted within the fuselage or in engine nacelles carried by stub wings on either side of the fuselage. Since the disposition and arrangement of such propulsive airscrews is not an integral part of the rotor transmission and control means of the present invention it is thought unnecessary to describe it in greater detail. Alternatively a propulsive force may be obtained by simultaneous tilting of the lift lines of the pair of rotors so that the rotors in addition to providing a lift force component also provide a horizontal component. By suitable inclination of the lift lines the direction of this horizontal component can be arranged to give motion in any direction.

Figure 11:
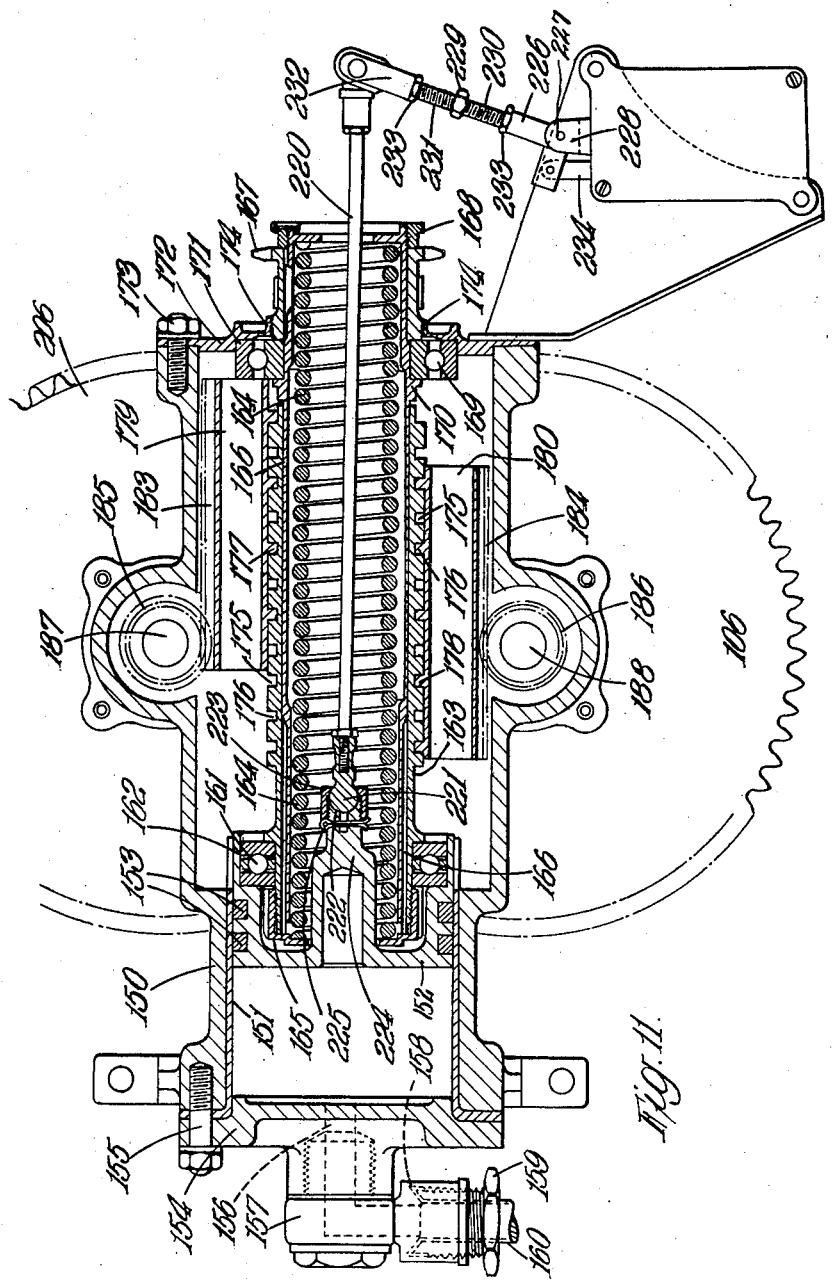
Fig. 11 is a sectional view on the line XI—XI of Fig. 10.

The rotor pitch control unit is illustrated in Figs. 10 and 11. It comprises a housing 150 having at one end a cylinder 151 in which a piston 152 with piston rings 153 is slidable. The cylinder head 154 secured to the housing 150 by studs and nuts 155 has a central passage 156 which communicates through a union 157 and a screwed pipe joint 158, 159 with a pipe 160 which leads to a pilot's or automatic rotor pitch control and thence to a source of oil pressure.

The piston 152 is connected, by a thrust ball bearing 161 (housed in a recess 162 in the piston), to a sleeve 163. The sleeve 163, and thus the piston, is urged by a coil spring 164 into the cylinder 151, the left hand end (as seen in Fig. 4) of the spring 164 abutting against an annulus 165 screwed onto the left hand end of the sleeve 163. Axially slidable within the sleeve 163 and splined thereto is a liner 166 which surrounds the spring 164 and carries at its right hand end a sprocket 167 clamped to the liner 166 by a screw ring 168 which also secures a ball journal bearing 169 against a collar 170 on the liner. The outer member of the ball bearing 169 is held in a recess 171 in a cover plate 172 clamped to the housing 150 by studs and nuts 173. The aperture in the cover plate 172 is a close fit over the liner 166 which passes through it and is provided with a dirt excluding packing 174.

Formed on the exterior of the sleeve 163 are coarse pitch left and right hand screw threads 175 and 176 which are similar to each other except in hand. These threads 175 and 176 are engaged respectively by projecting parts 177 and 178 on rack members 179 and 180 which are of generally cylindrical shape and slide in guides 181 and 182 in the housing 150 and have rack surfaces 183 and 184 which engage pinions 185 and 186 on shafts 187 and 188 respectively. The shaft 187 is mounted in journal ball bearings 189 and 190 housed in recesses 191 and 192 in the housing 150 and is held in position by a ring 193 and oil retaining packing 194. A flange 195 on the shaft 187 has a chain wheel 206 secured to it by bolts 196. The mounting of the shaft 188 is similar to that of the shaft 187 and it carries a chain wheel 106.

A rod 220 is attached to a projection 224 formed on the piston 152 by a ball joint comprising a ball 221 on the rod, a seating 222 and a screwed cap 223. The cap 223 is maintained against rotation by a split pin 225. The other end of the rod 220 is pivotally secured to the longer arm of a bell crank 226 pivoted at 227 to a bracket 228 mounted on the housing 150. The length of said longer arm of the bell crank 226 is adjustable by turning a central part 229, having left and right-hand threads 230 and 231, relatively to the ends 226 and 232 of said arm. Screwed nuts 233 are provided for locking this central part 229 in the desired adjustment position. The shorter arm of the bell crank 226 is connected by a Bowden wire or analogous transmission 234 to a rotor pitch indicator in the pilot's cockpit.

When oil pressure is applied from the pilot's or automatic rotor pitch control through the pipe 160 to the cylinder 151 it causes the piston 152 to move to the right (Fig. 11) against the action of the spring 164. As it moves, the piston carries with it the sleeve 163 which slides over the liner 166. The sleeve 163 being secured to the rack members 179 and 180 by the projections 177 and 178 carries these rack members with it, causing rotation of the pinions 185, 186 in opposite directions, thereby rotating the chain wheel 206 counter-clockwise and the chain wheel 106 clockwise. These chain wheels are coupled to the rotor hubs to give equal increase of the pitch of each rotor. When the oil pressure is reduced, the piston 152 urged by the spring 164 moves back towards the left and causes equal reduction of pitch of the rotors.

Referring to Figures 1, 11 and 12, rotation of the sprocket 167 causes turning of the liner 166 and the sleeve 163 splined thereto relatively to the housing 150 and piston 152. This turning brings into play the opposite handed threads 175 and 176 and hence movement of the rack members 179 and 180 in opposite directions giving equal and opposite or differential pitch change of the two rotors. This differential pitch change of the rotors is arranged to provide control of the aircraft in roll. The sprocket 167 is coupled to a pilot's control column 115 so that when the column is moved sideways the rotor pitches are altered differentially.

The construction of a rotor hub is illustrated in Figs. 5 to 9. Each rotor blade 250 is secured at its root end to a root member 251 supported by journal ball bearings 252 and 253 and a ball thrust bearing 254 in a hollow sleeve split into two parts 255 and 256 secured together by bolts and nuts 257 (see Figures 7A and 8). Each of the parts 255, 256 forming the sleeve has a lug 258 with an aperture 259 forming a housing for the roller bearing 260 of a flapping articulation (see Fig. 8). Each of the bearings 260 is held in position by a ring 261 with a locking screw 262. The pin members 263 of the flapping articulation are two opposite branches of a spider 264 having four branches in one plane mutually at right angles to each other. The branches 265, 270 form the inner members of a vertical drag articulation the axis of which intersects the flapping articulation at right angles. Plugs 266 are screwed into the ends of the pin members 263 which are hollow.

The drag articulation is best seen in Fig. 5A. The spider 264 has a pair of vertical pin members 265, 270 which form the inner parts of combined journal and thrust conical roller bearings 271 and 272. The outer part of the upper bearing 271 is held in a recess 273 in a lug 274 extending from the rotating shell 275 of the hub, while the outer part of the lower bearing 272 is similarly held in a recess 276 in a member 277 surrounding the shell 275 and secured thereto by bolts 278 which pass through holes in lugs 279 and 280 on the shell 275 and member 277 respectively.

A screwed plug 281 at the upper end of the upper pin member 265 rigidly secures thereto a plate 282 at each end of which links 283 are pivotally secured (see Fig. 7A). The other ends of these links 283 are pivotally secured to lugs 284 on plates 285 one for each blade arranged in pile form concentrically above the hub (see Fig. 5). Between adjacent plates 285 are arranged rings of friction material 286. The whole assembly forms a friction damper for movements about the drag articulations and is rotatable as a unit relatively to the shell 275 of the hub, together with a cover plate 340 of the hub.

As seen in Figures 5A and 8, a screwed plug 287 at the lower end of the lower pin member 270 holds in position a plate 288 which has a central aperture with a series of inwardly directed serrations 289. These serrations engage corresponding outwardly directed teeth 290 on the pin member 270 and allow the plate 288 and pin member 270 to be secured together in various rotational positions. The plug 287 is secured to the plate 288 by a set screw 291. The plate 288 has on its periphery stops 292 which cooperate with stops 293 on the housing 276 to limit movement of the blade about the drag articulation (see Fig. 8). By removing the plate 288 and re-engaging it in a different rotational position on the pin member 270 these limits can be altered.

The root member 251 of the blade has an inwardly directed extension 300 which terminates with a pair of arms which engage a circumferential groove 301 in a ball 302 the centre of which lies at the intersection of the flapping and drag axes. A similar groove 303 at right angles to the groove 301 is engaged by the forked arms 304 at one end of a shaft 305 which is supported in journal ball bearings 306 carried by a sleeve 307 which passes through the shell 275 and is screwed into a lug 308 thereon. Keyed to the inner end of the shaft 305, as seen in Figures 5 and 8, is a pitch change arm 309 which is secured in position by a bolt and nut 310 which clamp the split end of the arm 309 onto the shaft 305 and by a nut 311 on the shaft 305.

At its free end the pitch change arm 309 has a pin 312 which extends generally radially outwards and carries a spherical seating member 313 held in position by a bolt 316 and cooperating with an internal spherical surface 314 in an aperture at the upper end of a dependent pitch change link 315. At its lower end the pitch change link 315 has a similar surface 317 cooperating with a spherical seating member 318 held in position by a bolt 319 on a radial pin 320 carried by a swash plate 325.

The swash plate 325 is carried by bearings 326 and 327 on a spindle 328 which is tiltable in a vertical fore-and-aft plane about the axis of a pivot 329. The lower bearing 327 acts as a thrust and journal bearing while the upper, 326, separated from the former by a distance piece 330, is a journal bearing only and is secured by a nut 331 on the spindle 328. Secured by bolts 332 to the upper end 325a of the swash plate 325 is a lower element 333 of an universal joint 334 the other element 335 of which is secured to one part 336 of a link 336, 337 comprising two telescoping parts having splines 338 between them. The part 337 of the link is attached by an universal joint 339 to a flange of a cover plate 340 of the hub.

The cover plate 340 is bolted at 345 to an annular member 346 which supports the friction damper hereinbefore described and which is carried by journal bearings 347, 348 spaced by a distance piece 349 and secured by a nut 350 on an upwardly extending flange 351 of a bridge plate 352 secured to the upper end of the shell 275 of the hub by bolts 353.

It will be seen that the above-described connection between the swash plate 325 and the cover plate 340 ensures that they turn simultaneously while permitting vertical movement between them. Thus when the annular member 346 carrying the friction damper for lead-lag movements of the blades moves relatively to the shell 275 it turns the swash plate and prevents any pitch change due to such movement.

The spindle 328 has formed integrally with it a bell crank having two parallel arms 360 spaced apart and also a transverse bush 361 through which passes the pivot 329 carrying at each end a journal ball bearing 362 secured in position by a nut 363. The outer parts of the bearings 362 are supported by bushes 364 in flanges 365 extending upwardly from a crosshead 366 which is vertically slidable relatively to a fixed part 367 of the hub and is maintained against rotation by a keyway 359. The crosshead 366 has an internal flange 368 to which a flange 369 of a member 370 having coarse pitch internal and external screw threads, is secured by bolts 371.

The external thread on the member 370 is engaged by an internally screw threaded ring 372 supported by thrust bearings 373, which prevent vertical movement, in the fixed part 367 of the hub. The thrust bearings 373 have between them an oil retaining packing ring 374 and are held in position by a clamping ring 375. Bolted at 376 to the lower end of the ring 372 is a chain wheel 103 by which, as previously mentioned, the pitch of the rotor is controllable.

When the chain wheel 103 is turned it turns the ring 372, the screw thread on which causes the member 370 and crosshead 366 to move vertically carrying with it the pivot 329, spindle 328 and swash plate 325. Since the lower ends of the pitch change links 315 are secured to the swash plate 325 they transmit the vertical movement to the pitch change arms 309 secured to the blades thereby causing the shafts 305, ball 302 and blade root 251 to turn, altering the pitch.

Between the open ends of the arms 360 of the bell crank integral with the spindle 328 is a bolt 380 locked in position by a set screw 381. Carried by the bolt 380 is the inner element of a needle roller bearing 382 the housing of which is formed by an apertured lug 383 of a connecting link 384. A second needle roller bearing 385 is similarly mounted in an apertured lug 386 at the other end of the connecting link 384. The inner element of the bearing 385 is carried on a bolt 387 secured by a nut 388 and extending between flanges 389 at the upper end of a central member 390. The latter is secured to a sleeve 391 by combined journal and thrust bearings 392 which allow relative rotation but no axial movement between the central member 390 and sleeve 391. The bearings 392 are secured to the central member by a ring 393 and distance piece 394 and are similarly secured by a ring 395 and distance piece 396 to the sleeve 391.

The sleeve 391 has a flanged part 397 with an external screw thread cooperating with the internal screw thread on the member 370. On the exterior of the generally cylindrical part of the sleeve 391 are formed projections 398 which engage keyways 399 in the elongated bush 400 of the chain wheel 107. These keyways 399 permit the sleeve 391 to move vertically relatively to the hub but transmit to it rotational movements of the chain wheel 107. The bush 400 is supported by combined journal and thrust bearings 401 which are secured on the bush by a ring 402 and distance piece 403 and on the bush 404 of the chain wheel 103 by a ring 405 and distance piece 406.

When the chain wheel 107 is rotated it turns the sleeve 391 which moves vertically under the action of the screw threads on its flanged part 397 carrying with it the central member 390 and the lower end of the arms 360 of the bell crank which tilts the spindle 328 integral therewith. This tilts the swash plate 325 so that as it rotates with the rotor the lower ends of the pitch change links 315 move vertically up and down causing cyclic pitch change.

The rotors are driven from the common gearbox 110 by shafts 101 and 201. As seen in Figure 5A, the end of the shaft 101 nearest the rotor 100 has a flange not shown which is bolted to a flange 500 secured on a shaft 501 by keys 502 and a ring 503 screwed onto the shaft. The shaft 501 is carried in ball bearings 504 and a roller bearing 505 within a sleeve 506 slidable within a cylindrical projection from the main non-rotating part 367 of the hub. This sleeve provides means for locating the shaft in correct axial position so that a pinion 507 on the shaft 501 meshes properly with the crown wheel ring 102 of the rotor. This axial adjustment is provided by shims 508 interposed between a flange 509 on the sleeve 506 and a ring 510 clamped by studs and nuts 511 to the hub part 367. The ring 510 clamps the bearings 504, 505 and a distance piece 512 within the sleeve 506 and also provides a housing for an oil-retaining packing 513. On the shaft 501 the bearings and a distance piece 514 are secured by the clamping action of the ring 503.

The crown wheel ring 102 is bolted at 515 to an annulus 516 supported within the non-rotating part 367 of the hub by combined journal and thrust bearings 517, 518 supported by parts 519 and 520 respectively which latter are secured by studs and nuts 521 and 522 to the hub part 367. An oil-retaining packing 523 is held by a ring 524 carried by the part 520.

Figure 9:
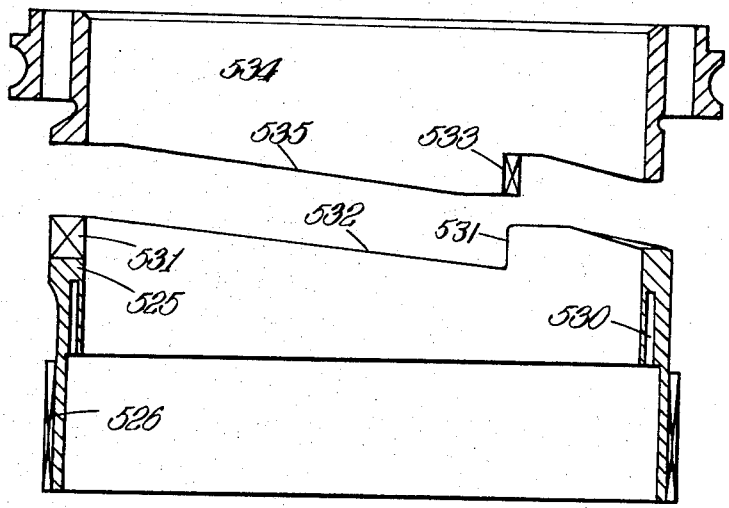
Fig. 9 is a fragmentary elevational section showing the freewheel clutch incorporated in the rotor hub.

Reference should now be made to Figure 9, in conjunction with Figure 5.

An axially slidable member 525 is attached by splines 526 to the inner surface of the annulus 516 and is urged upwardly by springs 527 surrounding rods 528 carried by a lower spacer 529 and by holes 530 in the member 525. The upper end of the member 525 has a series of dog clutch surfaces 531 spaced 120° (the same angle as that between the rotor blades) and backed off by inclined surfaces 532. These clutch surfaces 531 are adapted to engage corresponding surfaces 533 projecting downwardly from an upper clutch member 534, which also has inclined surfaces 535 corresponding to the inclined surfaces 532. The upper clutch member 534 is secured by the bolts 278 to the shell 275 and is supported near its upper end by a journal and thrust bearing 536 supported by the part 519 on the stationary part of the hub. While the rotor is being driven the surfaces 531 and 533 engage but when the rotor is over-running the drive, the member 525 is pressed downwardly against the action of the springs 527 by the inclined surfaces 532 and 535.

The lower end of the shell 275 is supported by a thrust and journal bearing 550 between said shell and the annulus 516. Secured to the lower end of the shell 275 is a rotor brake drum 551 held in position by a ring 552. The brake has two shoes 553 with surfaces of friction material. One end of each of the shoes 553 is pivotally connected at 556 to the stationary hub part 367, the pivot pin 556 being secured by a screw nut 557. The other ends of the brake shoes are held by a spring in contact with control plungers which move in a common cylinder 559 into the central part of which oil under pressure is introduced through a passage 560 when it is desired to stop the rotor.

Fig. 12 shows diagrammatically the rotor control system adapted for dual control, the pilots being seated in tandem. Two control columns 115, 115a are mounted on ball joints 700, 700a so as to be movable in any direction. The column 115 is coupled to the column 115a by a shaft 701 having an universal joint (not shown) at each end so that lateral movements of the columns are coordinated. The shaft 701 is suitably journalled and carries a chain wheel 702 coupled by a loop of chain 703, 703a to the sprocket 167 of the pitch control unit 150. The arrangement is such that lateral movements of the control columns give equal and opposite or differential pitch change of the two rotors. When the control columns are moved to the right the starboard rotor pitch is reduced while that of the port rotor is increased.

The control columns 115 and 115a are coupled together for equal fore and aft movement by a link 710 pivotally secured at its ends to the control columns. As illustrated the link 710 is arranged above the ball mountings 700 but if desided it could be arranged below. Reference has already been made to the cables 108, 108a and 208, 208a which have chain insertions which engage the cyclic pitch change wheels 107, 207 of the rotors 100 and 200 respectively. The cable 108 passes over a pulley 711 then downwards over a pulley 712 and rearwardly to attachment to the lower end 715 of the control column 115. Similarly the cable 208 passes over pulleys 713 and 714 and is secured to the same point 715. The cable 108a runs inwardly to a pulley 716, downwardly to a pulley 717 and forwardly to the lower end 718 of the other control column 115a. The cable 208a similarly passes over pulleys 719, 720 to the point 718. This arrangement provides for simultaneous equal cyclic pitch change of the two rotors when the control columns are moved forwardly or rearwardly giving pitching control of the aircraft.

The pulleys 714, 720 and 712, 717 are each mounted on shackles pivotally secured to the two ends of an arm 721 which is capable of swinging in a horizontal plane about its mid point 722. The arm is connected by crossed cables 723, 723a to the forward rudder bar 724a which can pivot in a horizontal plane about its mid point 725a. The other rudder bar 724 similarly mounted to turn about its mid point 725 is coupled by cables 726, 726a to turn with the rudder bar 724a.

When the right hand ends of the rudder bars are moved forward, the left hand end of the arm 721 is moved forwardly carrying with it the pulleys 712 and 717. This tends to put the cable 108 in tension while slackening the cable 108a thereby rotating the chain wheel 107. At the same time the chain wheel 207 of the other rotor is turned in the opposite sense thus causing differential cyclic pitch change of the rotors i. e. an inclination in opposite generally fore and aft directions of the lift lines of the two rotors, resulting in yawing of the aircraft. It will be seen that this yawing control is available in addition to the pitching control due to simultaneous equal inclination of the lift lines of the two rotors.

Fig. 13 shows an alternative arrangement in which the axes of the two rotors 100 and 200 are inclined towards each other upwardly giving increased lateral stability due to the dihedral effect. An equivalent inclination of the lift lines of the rotors could be obtained by cyclic pitch change but this would have the disadvantage of causing large movements during normal flight about the flapping articulations. Except as regards the inclination of the hub axes to the vertical, the control hub arrangements (for the embodiment of Figure 13) may be as illustrated in Figs. 1 to 12.

What I claim is:

1. In an aircraft, a sustaining rotor system comprising a pair of normally power driven sustaining rotors disposed on opposite sides of the longitudinal axis of the aircraft, a power unit, a transmission system from the power unit to each of the rotors, means for ensuring substantial equality of torque applied to each of the rotors at least during normal flight conditions, means incorporated in the power transmission to each rotor at a point beyond said first means permitting the rotors to independently overrun the drive under abnormal flight conditions, for instance in the event of failure of the power unit, and a control for altering the pitch angles of the blades in each of the rotors including pitch control connections positively operative to alter the pitch independently of rotor torque conditions.

2. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, and a control for altering the pitch angles of the blades of each of the rotors independently of their driven speeds.

3. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, and control means for altering the pitches of the rotors similarly or differentially under a given power-driven operation of the rotors.

4. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, a freewheel clutch permitting the rotors to overrun the drive under abnormal flight conditions, and control means for altering the pitches of the rotors similarly and for altering them differentially, under a given power-driven operation of the rotors.

5. For an aircraft having a pair of variable pitch sustaining rotors, a fluid pressure system for altering the pitches of both rotors similarly including a cylinder, a piston slidable in the cylinder, means for controlling the admission of pressure fluid to the cylinder, a rotatable sleeve movable with the piston having external right and left hand screw threads, a member engaging each of the screw threads, and a coupling between each of said members and its associated rotor to give change of the blade pitch angle when the member is moved axially of the cylinder.

6. For an aircraft having a pair of variable pitch sustaining rotors, a fluid pressure system for altering the pitches of both rotors similarly including a cylinder, a piston slidable in the cylinder, means for controlling the admission of pressure fluid to the cylinder, a rotatable sleeve movable with the piston having external right and left hand threads, a rack member engaging each of the screw threads, a pinion meshing with the rack of each of the rack members and a mechanical connection between each of said pinions and its associated rotor to give change of blade pitch angle when the member is moved axially of the cylinder.

7. For an aircraft having a pair of variable pitch sustaining rotors, a fluid pressure system for altering the pitches of both rotors similarly including a cylinder, a piston slidable in the cylinder, means for controlling the admission of pressure fluid to the cylinder, a rotatable sleeve movable with the piston having external right and left hand screw threads, a member engaging each of the screw threads, a coupling between each of said members and its associated rotor to give change of blade pitch angle when the member is moved axially of the cylinder and a sprocket mounted on the sleeve to rotate same to cause movement in opposite directions of the members engaging the screw threads thereby resulting in an increase of the blade pitch angles of one rotor relatively to the other.

8. For an aircraft having a pair of variable pitch sustaining rotors, a fluid pressure system for altering the pitches of both rotors similarly including a cylinder, a piston slidable in the cylinder, means for controlling the admission of pressure fluid to the cylinder, a rotatable sleeve movable with the piston having external right and left hand threads, a rack member engaging each of the screw threads, a pinion meshing with the rack of each of the rack members, a mechanical connection between each of said pinions and its associated rotor to give change of blade pitch angle when the member is moved axially of the cylinder, and a sprocket mounted on the sleeve to rotate same to cause movement in opposite directions of the rack members thereby resulting in an increase of the blade pitch angles of one rotor relatively to the other.

9. For an aircraft having a pair of variable pitch sustaining rotors, a fluid pressure system for altering the pitches of both rotors similarly including a cylinder, a piston slidable in the cylinder, means for controlling the admission of pressure fluid to the cylinder, a rotatable sleeve movable with the piston having external right and left hand screw threads, a member engaging each of the screw threads, and a coupling between each of said members and its associated rotor to give change of blade pitch angle when the member is moved axially of the cylinder and a connection between the sleeve and a pilot's control, for instance a control column, for rotating the sleeve when the control is moved laterally, to cause an increase of the blade pitch angles of one rotor relatively to the other (i. e. differential pitch change of the rotors) thereby to provide lateral control of the aircraft.

10. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, and means causing differential pitch change of the rotors when the pilot's control is moved laterally, thereby to provide lateral control of the aircraft.

11. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means for causing differential pitch change of the rotors when the pilot's control is moved laterally, thereby to provide lateral control of the aircraft, and mechanism for shifting the lift lines of the rotors.

12. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means for causing differential pitch change of the rotors when the pilot's control is moved laterally, thereby to provide lateral control of the aircraft, and mechanism for shifting the lift lines of the rotors in a direction generally fore and aft of the aircraft.

13. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means causing differential pitch change of the rotors when the pilot's control is moved laterally, thereby to provide lateral control of the aircraft, and mechanism for causing cyclic pitch change of the rotor blades whereby to produce shifting of the lift lines of the rotors.

14. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means causing differential pitch change of the rotors when the pilot's control is moved laterally, thereby to provide lateral control of the aircraft, and mechanism for causing cyclic pitch angle change of the rotor blades whereby to produce shifting of the lift lines of the rotors in a direction generally fore and aft of the aircraft.

15. In an aircraft, a sustaining rotor system comprising a pair of normally power driven sustaining rotors disposed on opposite sides of the longitudinal axis of the aircraft, a power unit, a transmission system from the power unit to each of the rotors, means for ensuring substantial equality of torque applied to each of the rotors at least during normal flight conditions, and mechanism for shifting the lift lines of the rotors at least differentially.

16. In an aircraft, a sustaining rotor system comprising a pair of normally power driven sustaining rotors disposed on opposite sides of the longitudinal axis of the aircraft, a power unit, a transmission system from the power unit to each of the rotors, means for ensuring substantial equality of torque applied to each of the rotors at least during normal flight conditions and mechanism for shifting the lift lines of the rotors similarly and differentially in a direction generally fore and aft of the aircraft.

17. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means causing differential pitch change of the rotors when the pilot's control is moved laterally, thereby to provide lateral control of the aircraft, and mechanism for shifting the lift lines of the rotors simultaneously in a direction generally fore and aft of the aircraft when the control column is moved rearwardly and forwardly to provide fore and aft (pitching) control of the aircraft.

18. In an aircraft, a sustaining rotor system comprising a pair of normally power driven sustaining rotors disposed on opposite sides of the longitudinal axes of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means causing differential pitch change of the rotors when the pilot's control is moved laterally, thereby to provide lateral control of the aircraft, and mechanism for shifting the lift lines of the rotors differentially in opposite generally fore and aft directions, with a pilot's rudder control coupled to said mechanism whereby to provide control of the aircraft in yaw.

19. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means causing differential pitch change of the rotors when the pilot's control is moved laterally, thereby to provide lateral control of the aircraft, mechanism coupling said pilot's control to each of the rotors to effect simultaneous shifting of the lift lines of the rotors when the pilot's control is moved rearwardly and forwardly whereby to provide fore and aft (pitching) control of the aircraft, a pilot's rudder control and mechanism coupling it to each of the rotors to produce shifting of the lift lines of the rotors in opposite generally fore and aft directions when the rudder control is moved to provide yawing control of the aircraft.

20. In an aircraft, a sustaining rotor system comprising a pair of normally power driven sustaining rotors disposed on opposite sides of the longitudinal axis of the aircraft, a power unit, a transmission system from the power unit to each of the rotors, a differential balance gear included in the transmission system for maintaining substantial equality of torque applied to each of the rotors at least during normal flight conditions, control means for altering the pitches of the rotors similarly, a pilot's control, for instance a control column, means causing differential pitch change of the rotors when the pilot's control is moved laterally, thereby providing lateral control of the aircraft, mechanism coupling said pilot's control to each of the rotors to effect simultaneous and similar shifting of the lift lines of the rotors when the pilot's control is moved rearwardly and forwardly whereby to provide fore and aft (pitching) control of the aircraft, a pilot's rudder control and further mechanism coupling it to each of the rotors to produce shifting of the lift lines of the rotors in opposite generally fore and aft directions when the rudder control is moved to provide yawing control of the aircraft, the shifting of the lift line of a rotor being obtained in each case by means effecting cyclic pitch change of the rotor blade pitch angles.

21. In an aircraft, a pair of side-by-side sustaining rotors, the blades of each rotor being mounted for pitch variation for control of the aircraft in flight, engine means for driving the rotors, power transmission mechanism between the engine means and the rotors including differential gearing maintaining equal application of torque to the two rotors notwithstanding variations in rotational drag as between the two rotors incident to blade pitch change for control, and blade pitch control means operative irrespective of rotor torque conditions.

22. A construction in accordance with claim 21, incorporating for each rotor an overrunning clutch disposed in the rotor drive transmission between the differential gearing and the rotor.

23. The construction of claim 21, wherein the rotor blade pitch control includes a pitch-regulating device actuable by a governor and connected to both rotors.

24. The construction of claim 21, wherein the rotor blade pitch control includes a manual control device.

25. The construction of claim 21, wherein the rotor blade pitch control includes a pitch-regulating device actuable by a governor, and a manually actuable pitch control device, one of said devices being connected so that its action is superimposed on the other.

CYRIL GEORGE PULLIN.

CERTIFICATE OF CORRECTION.

Patent No. 2,337,570. December 28, 1943.

CYRIL GEORGE PULLIN.

It is hereby certified that error appears in the printed specification of the above numbered patent requiring correction as follows: Page 3, second column, line 1, for "screw" read --screwed--; page 5, second column, line 74-75, for "desided" read --desired--; page 6, first column, line 55, after "control" insert --and--; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.